J. H. BEERY.
MOLDING AND PRESSING MACHINE.
APPLICATION FILED MAR. 20, 1914.

1,137,377.

Patented Apr. 27, 1915.
4 SHEETS—SHEET 1.

Fig. 1.

Fig. 2.

Witnesses

Inventor
John H. Beery

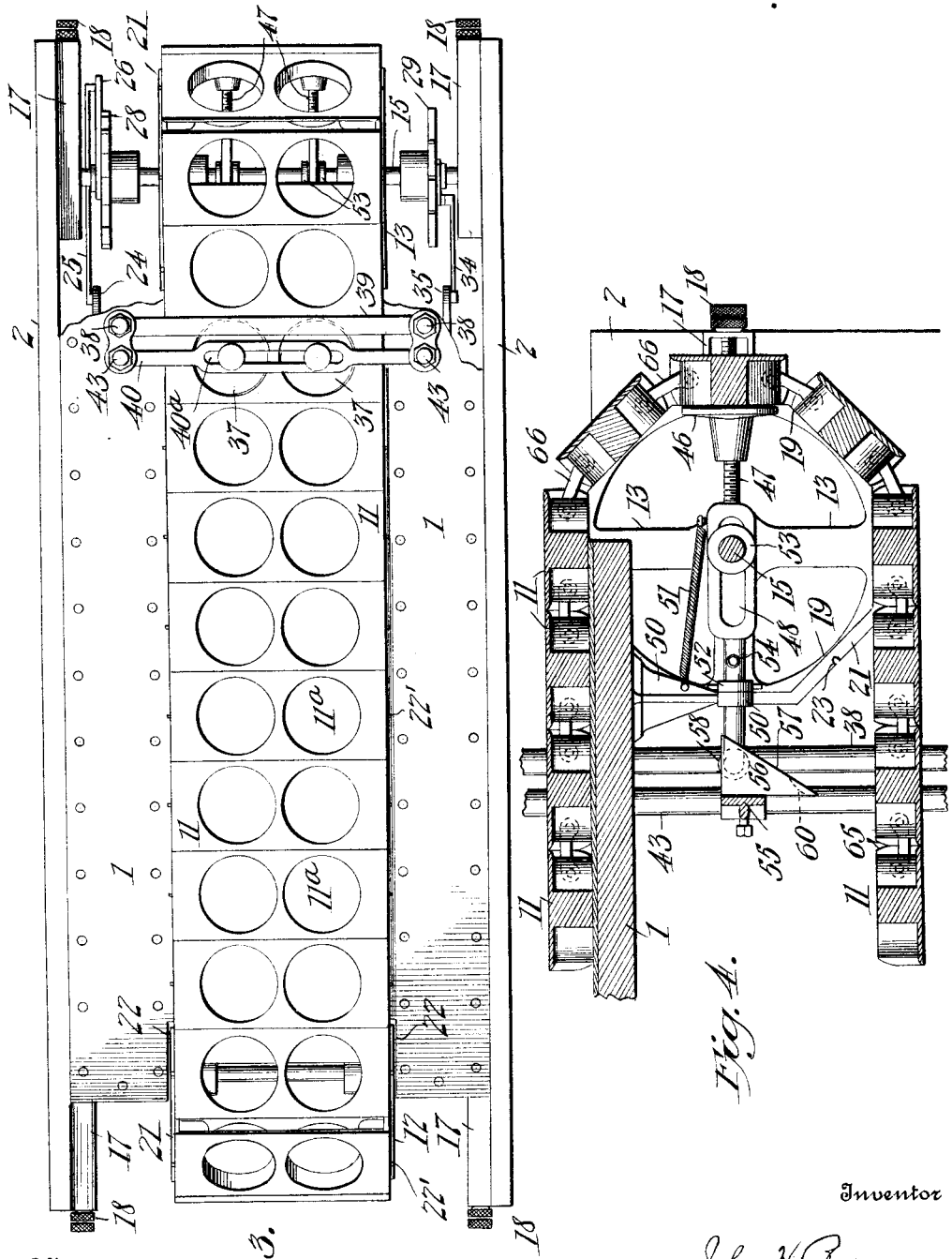

J. H. BEERY.
MOLDING AND PRESSING MACHINE.
APPLICATION FILED MAR. 20, 1914.
1,137,377.
Patented Apr. 27, 1915.
4 SHEETS—SHEET 3.
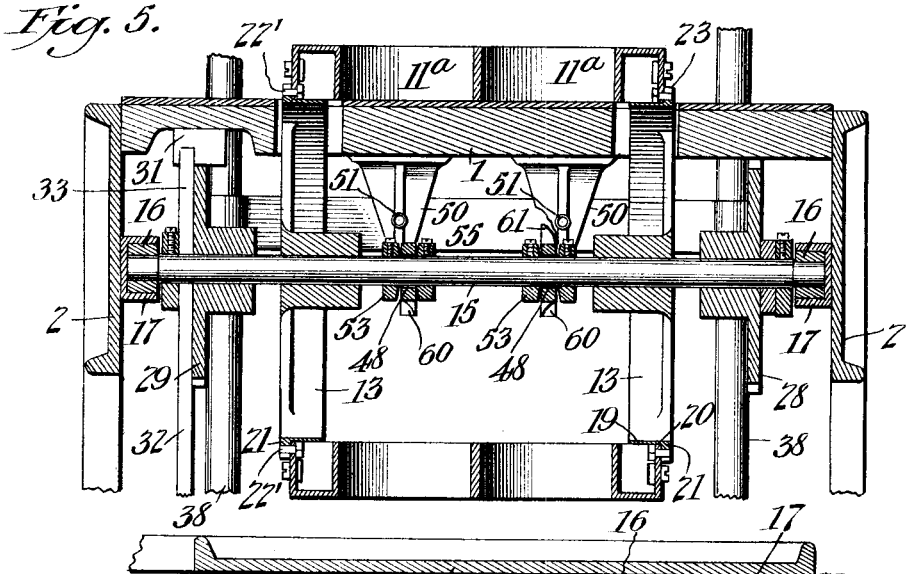
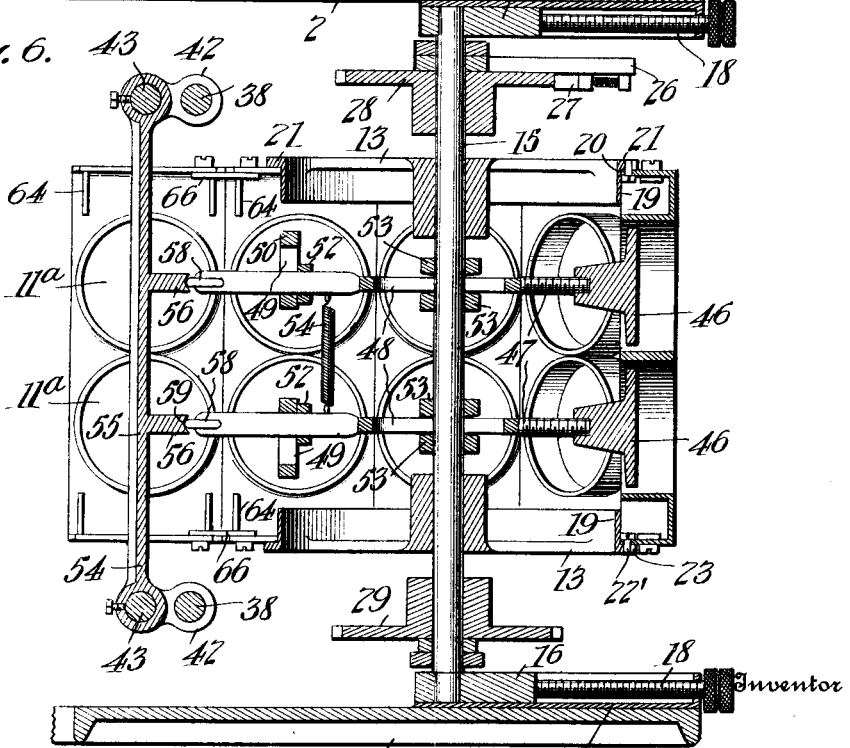

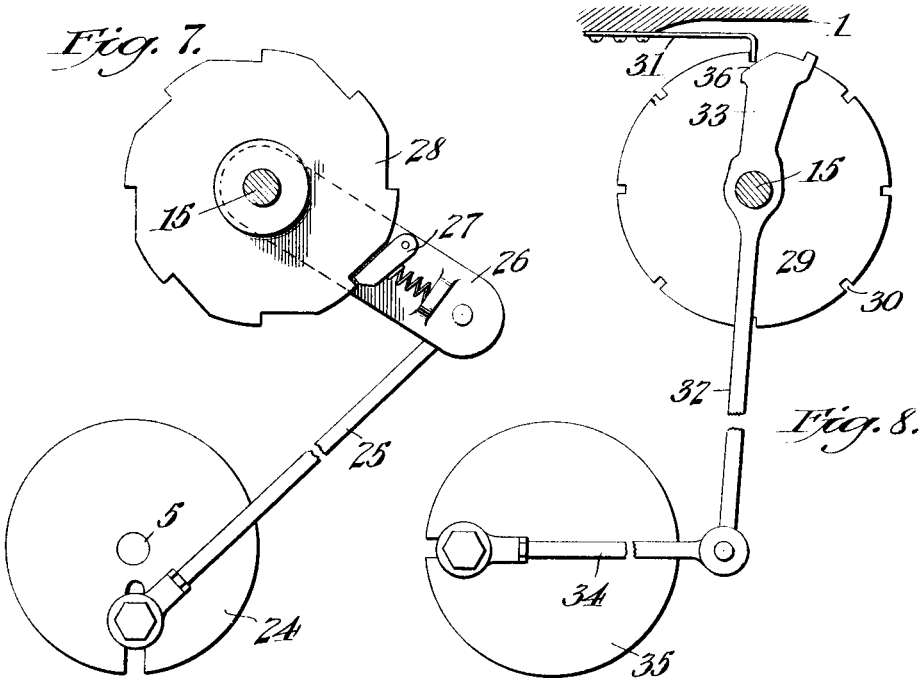
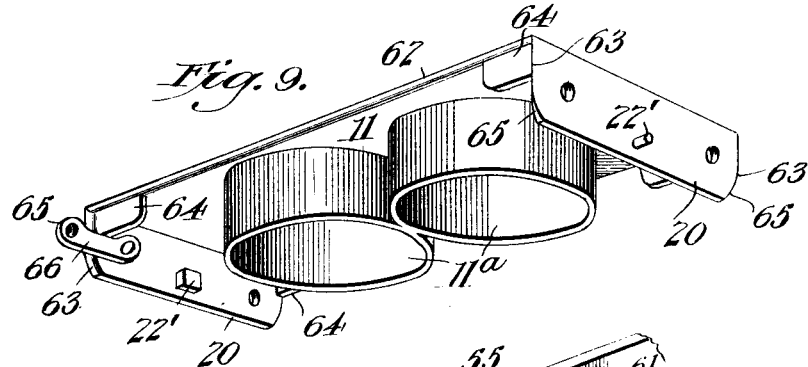
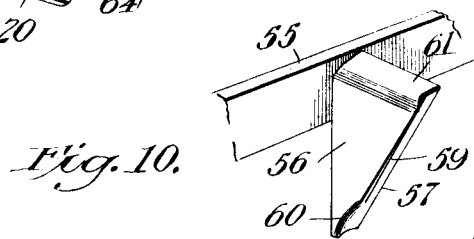

UNITED STATES PATENT OFFICE.

JOHN H. BEERY, OF SPRINGFIELD, OHIO, ASSIGNOR OF ONE-FOURTH TO H. A. BOXILL, ONE-FOURTH TO PLINY M. GALE, AND ONE-FOURTH TO VANCE TOWLER, ALL OF CINCINNATI, OHIO.

MOLDING AND PRESSING MACHINE.

1,137,377.   Specification of Letters Patent.   Patented Apr. 27, 1915.

Application filed March 20, 1914. Serial No. 826,045.

*To all whom it may concern:*

Be it known that I, JOHN H. BEERY, a citizen of the United States, residing at Springfield, in the county of Clark and State of Ohio, have invented certain new and useful Improvements in Molding and Pressing Machines; and I do hereby declare that the following is a full, clear, and exact description thereof.
This invention relates to machines for molding granular materials, more particularly edible granular materials mixed with a suitable substance such as melted butter, syrup or the like, which acts as a binder for the molded granular edible. This edible may be nuts, a breakfast food, popcorn or any other relatively dry edible material in grains, small particles or lumps or flakes.

I will describe my machine as used in making popcorn fritters, composed of popcorn and a crisp syrup as a binder.

Among the more important objects of the invention are increase of efficiency, speed, compactness, ample strength of parts, quietness of operation, and reduction of power necessary for operating machines of this class at high speed.

The binding agent, used in the making of the fritters, quickly crystallizes and becomes brittle after hardening, and if the fritter is allowed to harden in the mold, it will be broken or damaged by the impact of the ejector plunger when the latter strikes the fritter in removing it from the mold.
An important feature of the invention is in the provision of means for ejecting the pressed fritter from the mold as soon as possible after the material has been pressed.

Another feature of the invention is in the provision of means for so timing the working periods of the ejector and press plungers that when the motive power is being used for actuating the ejector plungers, the press plungers are being moved into working position and the power necessary for the pressing operation is not brought into use until the ejector plunger has ceased to work.

Another feature of the invention consists in providing an endless series of mold sections having an intermittent movement and in which the molds, when in position for receiving the material to be molded, form a perfectly smooth and unbroken surface from which the material may be wiped or pushed into the forms; the abutting edges of the mold sections are so formed that they automatically dispose of any material that may accidentally lodge between the edges during the orbit of the mold sections.

The manner in which the various objects are attained will be understood readily from the following description in connection with the accompanying drawings, in which is illustrated the preferred form of the invention.

In the drawings—Figure 1 is a side elevation of the machine, a portion of the frame being broken away to show certain parts. Fig. 2 is a right hand end elevation of Fig. 1. Fig. 3 is a top plan view of the machine on an enlarged scale. Fig. 4 is an enlarged longitudinal vertical section of the machine showing the discharge end of the ejector mechanism. Fig. 5 is a transverse vertical section taken at right angles to Fig. 4. Fig. 6 is a horizontal section of Fig. 4. Fig. 7 is an enlarged detail view of the mold driving mechanism. Fig. 8 is a like view of the machanism for periodically unlocking the molds. Fig. 9 is a perspective view of one of the mold sections, and Fig. 10 is a perspective of part of the plunger actuating mechanism.

Referring in detail to the construction illustrated, 1 designates a table over which the molds travel. The table forms the mold bottoms, and coöperates with the press plungers to compress the fritters. The table 1 is mounted between two lateral frames 2 at the top of the latter; and between said frames beneath the table near the right hand end thereof is a transverse support 3 formed with two standards 4 in which is journaled a power shaft 5. This shaft is driven in any suitable manner, as by the motor 6 mounted between the frames 2 and connected up to the power shaft through a speed reducing mechanism 7, of any suitable type, provided with a driving sprocket wheel 8 which is connected by a drive chain 9 to a sprocket wheel 10, on the power shaft 5.

The intermittently traveling endless mold consists of a plurality of sections 11 flexibly connected together to form an endless chain which is mounted on rotatable supports 12, 13, fixed on shaft 14, 15, respectively. The shafts are journaled at opposite ends of the table in blocks 16, which are slidably mounted in horizontal ways 17 and are adjustable longitudinally of the table by means of adjusting screws 18 working in the ends of the ways.

The rotatable supports 12, 13, are polygonal in form, preferably octagonal, as shown. The sides 19 of said supports form straight or flat bearings for the sides 20 of the mold sections 11, (Fig. 9), and are provided with lateral flanges 21, (Fig. 4).

As shown in Figs. 1 and 4, the bearings 19, in revolving move through slots 22 in the ends of the table 1 and into the horizontal plane of the top of the table, while the lateral flanges 21 project above said plane.

Movement is imparted to the endless mold chain by the carrier 13, the shaft 15 of which is driven by the means hereinafter described. In addition to the bearings 19, which operate as driving elements, each mold section 11 has laterally projecting pins 22′ (Fig. 9), projecting from the center of the sides 20 near the lower edges thereof. These pins take into notches 23 formed in the upper edges of the lateral flanges 21 when the mold section rests on the bearings 19.

The means for intermittently driving the shaft 15, that carries the rotatable support 13, consists of a crank disk 24, fixed on one end of the power shaft 5, said disk being provided with an adjustable pitman 25 which is hinged to a lever arm 26 pivoted on the shaft 15. The arm 26 carries a spring urged pawl 27, (Fig. 7) which engages a ratchet wheel 28 fixed on the shaft 15. The number of teeth in the ratchet wheel corresponds to the number of sides of the rotatable mold supports 12, 13, in this embodiment eight being the number employed. One revolution of the shaft 5 will cause the crank disk 24 to move the arm 26, the shaft 15, and the support 13, one-eighth of a revolution, thereby moving the endless mold a distance equal to the width of one mold section.

Means are provided for locking the mold support against movement during the upward movement of the arm 26 which movement brings the pawl 27 into position for engagement with the next tooth of the ratchet wheel 28. It is during this upward movement, that the ejector and press plungers are successively operated to perform their respective functions, as will be hereinafter described. The locking means comprises a disk 29 fixed on the shaft 15, and provided with a series of peripheral notches 30, which correspond in number to the number of teeth on the ratchet 28 and to the number of sides of the supports 12, 13. These notches are so positioned that when the crank disk 24 and shaft 5 have moved 180 degrees, or a half revolution, and the ratchet 28 made an eighth of a revolution or one step, one of the notches 30 of the disk 29, i. e., the top notch, is engaged by the free end of a spring catch 31, mounted on the underside of the table 1. The disk 29 and shaft 15 are thus locked against rotation until the disk 24 has made the second half of its revolution and returned the arm 26, with its pawl, into its extreme upper position and into engagement with another tooth of the ratchet 28. Simultaneously with the movement of the arm 26 on its downward movement, the catch 31 is operated to release the disk 29.

The catch releasing mechanism comprises an oscillatory two armed lever 32—33, pivoted on the shaft 15, and having its lower arm 32 pivotally connected by an adjustable pitman 34 which is connected to a crank disk 35 fixed on the end of the power shaft 5 opposite to that of the crank disk 24. The upper arm 33 of the two armed lever extends to the periphery of the disk 29 and has formed on its free end a cam face 36 arranged to engage the free end of the spring catch 31, which, as shown in Fig. 5, extends over the arm 33. The movement of the releasing lever 32—33 is so timed that the cam 36 will be moved under the free end of the catch 31 and will raise the latter out of a notch simultaneously with or a moment before the disk 29 is moved by the operation of the pawl and ratchet mechanism above described. After the releasing lever has raised the catch 31, it is rocked from beneath the latter and during the movement of the disk 29, the free end of the catch rides on the periphery of the disk between the notches.

When the disk and its shaft 15 has been moved an eighth of a complete revolution the next notch will come under the catch, and the latter is, owing to the oscillation of the lever 32—33 by the crank disk 35, free to engage said notch and lock the disk 29 and shaft 15 against further movement until the pawl 27 has been again brought into operative position for rotating the ratchet.

The mechanism for operating the press plungers 37 comprises two stationary guide rods 38, which are mounted on the standards 4, and extending upwardly through the table 1 are connected at their upper ends by a cross brace 39. A reciprocating plunger frame is composed of two horizontal cross heads 40, 41, which have bearing sleeves 42, slidably mounted on the guide rods 38, and connected together by side bars 43. The plungers are mounted in the cross head 40 above the table and are adjustable vertically in the head by means of screw shanks 37ᵃ which may be laterally adjusted in a longitudinal slot 40ᵃ formed in the head. The cross head 41 is below the table and is connected by a pitman 44 to the main driving crank 45 formed in the central part of the power shaft 5.

The crank pin of the disk 24 and the crank pin of the disk 35 are in such angular relation to the main crank 45 that when the pin of disk 24 is in position for operating the chain of molds 11, the press plungers are being raised by the crank 45, and when the latter is in position for lowering the plungers, the crank pin of disk 24 will have moved out of its operative position and the pin of disk 35 will have caused the release of the latch and the molds will be locked.

The ejector plungers reciprocate at right angles to the movements of the presser plungers and are operated on the downward movement of the reciprocating frame to eject the pressed articles in advance of the pressing action of the press plungers. Each ejector plunger consists of a head 46 (Fig. 4) adjustably mounted on the outer threaded end portion of a rod 47 which has a slotted central portion 48 through which the shaft 15 projects. The inner portion of rod 47 is guided in a slot 49 formed in the end of a bracket 50 depending from the table 1, and a spring 51 is connected to the bracket and rod to yieldingly hold the latter in a retracted position, as shown in Fig. 4. The movement of the rod by the spring is limited by an adjustable collar 52, on the rod, abutting against the lower end of bracket 50. To prevent the rod from moving longitudinally of the shaft 15, a collar 53, (Fig. 6) is mounted on said shaft on each side of the rod, and to permit a pivotal movement of the latter on the shaft in a horizontal plane the inner faces of the collars 53 are beveled. The two ejector plungers are yieldingly held in parallel relation and against the inner ends of the slots 49 by means of a spring 54 which connects said rods together between the brackets 50 and the shaft 15.

Adjustably connected to the side bars 43 about midway between the cross heads 40, 41, is a cross member 55 which carries two wedge-shaped members or cams 56. Each wedge is formed with a downwardly inclined bearing face 57 (Fig. 4) adapted to engage an anti-friction roller 58 on the inner end of the plunger rod 47, so as to move the latter outward when the reciprocating frame moves downward. In each bearing face 57 is formed a longitudinal guide groove 59, (Fig. 6) the outer wall of which is cut away at its lower end as indicated at 60, (Fig. 10) to permit the roller 58 to be drawn into the groove by the spring 54. The groove serves to prevent lateral movement of the roller on the bearing face 57 during the downward movement of the wedge. As the wedges pass below the rods 47 the latter are suddenly retracted by the springs 51 and as the rear ends of said rods project into the paths of the wedges, 56, as shown in Fig. 1, the tops of the latter are formed with outwardly beveled edges 61 (Fig. 10). When the beveled edges 61 engage the rollers the inner ends of the rods are moved apart, but are held against the outer sides of the wedges 56 by the tension of the spring 54. As soon as the lower ends of the wedges 56 are raised above the rollers, the latter are drawn by the spring 54 onto the cut away portion 60 and into the grooves 59. It will thus be seen that as the wedges 56 are moved with the press plungers and in advance of the latter the ejecting plungers are actuated and eject the previously pressed material before the press plungers have been lowered sufficiently to engage the unpressed material in the molds. Consequently, the power used in the ejecting and pressing operations is not utilized simultaneously, but successively.

Each mold section 11 is formed with one or more forming apertures 11ª and has its longitudinal edges 62 and the front and rear edges 63 of the sides 20 beveled or rounded toward the interior of the section so as to form sharp edges. When the mold sections are brought together the edges of adjacent sections coöperate to cut or squeeze out any material that may have adhered to said edges during the period they were separated in moving from the top of the table to the underside thereof. Strengthening webs 64 connect the top and sides of the mold at the inner edges of the bevels. The sides of the molds are rounded on the lower corners as shown at 65 to permit them to readily break joints when traveling on the supports.

The mold sections are hinged together by links 66 pivotally connected to the sides 20 midway between the upper and lower edges of the latter and by mounting the pins 22' in the center of the sides 20 and below the point where the links are connected to the sides the pull exerted on the mold by the bearings 19 is divided between the pins and hinges.

The operation of the machine is as follows: Popcorn mixed with sufficient crisp syrup to hold it together, is dumped on top of the mold sections 11 filling the molds, which are free to move in accordance with the functioning of the machine. The filled molds progress step by step toward the press plungers 37, remain momentarily thereunder until pressed by said plungers and are, during the raising of the plungers, progressed step by step in front of the ejector plungers 46, the ejectors operating during the idle movement of the plungers 37. The distance of travel from the pressers 37 to the ejectors 46 is sufficiently short to eject the material before the binding agent in this particular case, the sugar syrup, has set.

I claim—

1. In a molding and pressing machine, the combination with a series of intermittently advancing molds, a plunger for pressing material in the molds, and means for moving the plunger into and out of the molds, of a plunger for ejecting the pressed material from the molds, and means for moving the ejector plunger into and out of the molds during the advance of the press plunger.

2. In a molding and pressing machine, the combination with a series of intermittently advancing molds, a plunger for pressing material in the molds, and means for moving the plunger into and out of the molds, of a plunger for ejecting the pressed material from the molds, and means for moving the ejector into and out of the molds during the advance of the press plunger, and before the latter is brought into contact with the material to be pressed.

3. In a molding and pressing machine, a press plunger, a series of intermittently advancing molds, a frame carrying the plunger, means to reciprocate the frame to move the plunger into and out of the molds, an ejector plunger, and means on the frame to advance the latter into the molds.

4. In a molding and pressing machine, a press plunger, a series of intermittently advancing molds, a frame carrying the plunger, means to reciprocate the frame to move the plunger into and out of the molds, an ejector plunger, means on the frame to advance the latter into the molds, and means independent of the advancing means to retract the ejector plunger.

5. In a molding and pressing machine, a press plunger, a series of intermittently advancing molds, a frame carrying the plunger, means to reciprocate the frame to move the plunger into and out of the molds, an ejector plunger, means on the frame to advance the latter into the molds, and a spring to retract the ejector plunger after advancement.

6. In a molding and pressing machine, a series of intermittently advancing molds, a plunger for pressing material in the molds, a frame carrying said plunger, means to reciprocate the frame to move the plunger into and out of the molds, an ejector plunger movable into and out of the molds, yielding means to hold the ejector plunger in a retracted position, and means operable by the movement of the frame in one direction to project the ejector plunger into the molds.

7. A molding and pressing machine comprising an endless chain of molds, rotatable supports therefor, a reciprocating frame, press plungers mounted thereon and movable into and out of the molds by the frame, ejector plungers operated from the frame, mechanism for moving the chain supports intermittently, means for locking said supports against rotation, mechanism for releasing the locking mechanism, a power shaft and means on the latter for reciprocating the frame, and for actuating the releasing and moving mechanisms.

8. In a molding and pressing machine, a reciprocating plunger frame, pivotally mounted reciprocating ejectors, wedge-shaped members on the frame arranged to engage the stems of the ejectors and advance the latter during the movement of the frame in one direction, means to retract the ejectors into the return paths of said members, means on the latter to swing the ejector stems on their pivots out of the paths of the wedge members and means to swing said stems into the paths of the wedges after the latter have passed the stem.

9. In a molding and pressing machine, an ejecting mechanism comprising a pivoted ejecting member, means to advance the latter, means to return the advanced member, means to swing said member laterally, and means to return said member from its lateral position.

10. In a molding and pressing machine, an ejecting mechanism comprising a pivoted plunger, means to advance the latter, means to return the advanced plunger into the path of the advancing means, means on the latter to swing the returned plunger out of the path of said advancing means, and means to swing the plunger into the path of said advancing means.

11. In a molding and pressing machine, an ejecting mechanism comprising a reciprocable plunger, a reciprocable wedge-shaped member having a bearing face arranged to engage the stem of the plunger to advance the latter in one direction, means to retract the advanced plunger into the return path of said member, means on the latter to swing the plunger stem out of the path of the wedge-shaped member, and means to swing said stem into the path of said member.

12. In a molding and pressing machine, an ejecting mechanism comprising a pivoted, reciprocable plunger, a reciprocable wedge-shaped member having a grooved bearing face arranged to engage the stem of the plunger, and advance the latter in one direction, said groove having a cut-away portion to permit said stem to enter the groove, means to retract the advanced plunger, a beveled face on said member to swing the plunger stem laterally, and a spring to return the plunger from its lateral position.

13. In a molding and pressing machine, an endless chain of contacting mold sections, links pivotally connected to the sides of said sections between the upper and lower edges of the sides, and laterally projecting pins in the sides near the lower edges of the latter, and polygonal rotatable supporting members having notches formed in their sides for engaging said pins.

14. In a molding and pressing machine, a table, polygonal rotatable supports journaled at each end of the table, the sides of the supports constituting flat bearing surfaces movable into the plane of the table, centrally notched lateral flanges on said bearing surfaces, an endless mold comprising a series of sections fitting said bearing surfaces, links pivotally connected to the sides of said sections midway between the upper and lower edges of the sides, pins projecting laterally from said sides near the lower edges thereof between the links and adapted to engage the notches formed in said flanges.

15. In a molding and pressing machine, a table, polygonal rotatable supports journaled at each end of the table, the sides of the supports constituting flat bearing surfaces movable into the plane of the table, centrally notched lateral flanges on said bearing surfaces, an endless mold comprising a series of sections fitting said bearing surfaces, links pivotally connected to the sides of said sections midway between the upper and lower edges of the sides, pins projecting laterally from said sides near the lower edges thereof between the links and adapted to engage the notches formed in said flanges, said sides having the lower portion of their edges rounded off to permit them to break joints when traveling on the supports.

In testimony that I claim the foregoing as my invention, I have signed my name in presence of two subscribing witnesses.

JOHN H. BEERY.

Witnesses:
ARTHUR J. TODD,
H. CLAY DE VOY.

Copies of this patent may be obtained for five cents each, by addressing the "Commissioner of Patents, Washington, D. C."